Sept. 15, 1964     H. L. HOKE     3,148,696

ACORN VALVE FOR PUNCHING T

Filed June 8, 1961

INVENTOR.
HOWARD L. HOKE

United States Patent Office 3,148,696
Patented Sept. 15, 1964

3,148,696
ACORN VALVE FOR PUNCHING T
Howard L. Hoke, Bradford, Pa., assignor to Dresser Industries, Inc., Dallas, Tex., a corporation of Delaware
Filed June 8, 1961, Ser. No. 115,670
1 Claim. (Cl. 137—318)

The present invention relates broadly to punching T's and is concerned primarily with improvements in the acorn valve which is the very heart of a punching T of the character with which this invention is concerned.

In the co-pending application of Roger E. Risley and Gerald L. Bucheit, Serial #28,575, filed May 12, 1960, there is disclosed a punching T, the body of which is anchored to a gas main by welding. The T body carries an acorn valve that is made of rubber and which has a rounded nose formed with a slit. When the gas main is to be penetrated, a punch is passed through the acorn valve, the passage being accommodated by the slit. After the main has been punched, the punch is removed and the slit closes under the influence of the elastic and resilient properties of the rubber acorn valve. A cap is subsequently applied which supplements the acorn valve in closing off the top of the T body against the escape of gas.

In actual practice it has been found that the acorn valve of the aforesaid application is unsatisfactory in two respects which are intended to be improved by this invention.

It has been found that if the punch is left in the valve for a prolonged period, such as when a worker might take time off for lunch or other purposes, and then later removed, the rubber will have partially set or lost some of its elastic characteristics while distended by the punch so that when the punch is removed the slit will not completely close. This, of course, will permit of some escape of gas which is highly undesirable.

In view of this condition the present invention has in view as its primary objective, the provision of mechanical means for supplementing the elastic and resilient properties of the rubber to cause the slit to close when the punch is removed therefrom.

More in detail, the invention has as an objective the provision of an acorn valve of the type above noted in which a contractible spring is mounted about the rounded nose in the zone of the slit and which spring always exhibits a tendency to maintain the slit closed. The spring preferably takes the form of a full circle coil spring.

Still more in detail, the invention has as an object the provision of an acorn valve of the type aforesaid the nose of which is formed with an annular groove in the zone of the slit and which groove receives the spring aforesaid.

Another highly important object of the present invention is to provide an acorn valve of the type noted which is formed at its upper end with an outstanding flange. This flange overlies the upper end of the T body and when the tool is applied, functions as a gasket or packing to further insure against the escape of gas.

Various other more detailed objects and advantages of the invention such as arise in connection with carrying out the above noted ideas in a practical embodiment will in part become apparent and in part be hereinafter stated as the description of the invention proceeds.

The invention therefore comprises an acorn valve for punching T of the type disclosed in the above identified application and which acorn valve has a nose formed with an annular groove receiving a contractible spring to maintain the slit in the nose closed and a flange on its upper end which functions as a gasket.

For a full and more complete understanding of the invention reference may be had to the following description and accompanying drawing wherein.

Figure 4:
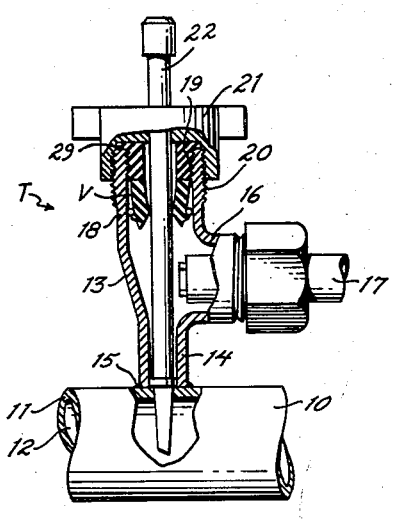
FIGURE 4 is a side view of a portion of a gas main with parts broken away and a punching T including the acorn valve of this invention mounted thereon. In this view the body of the punching T is shown in section and with the punch in penetrating position.
Figure 5:
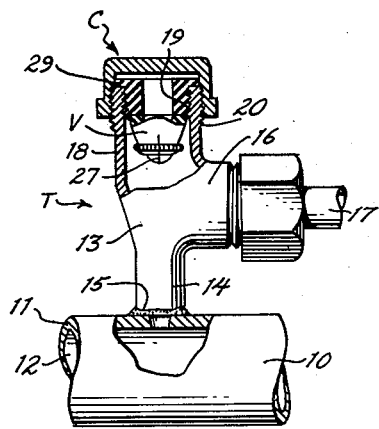
FIGURE 5 is a side view similar to FIGURE 4 showing the punch as removed and the T body closed by a cap.

Referring now to the drawing wherein like reference characters denote corresponding parts and first more particularly the Figures 4 and 5 a portion of a gas main is therein illustrated and identified by the reference character 10. The gas main 10 is defined by a wall 11 having a bore 12.

A punching T is referred to in its entirety by the reference character T. The punching T T comprises a body 13 terminating at the bottom in a restricted neck 14 that is anchored to the main wall 11 by weld 15. Just above the neck 14 the T body 13 is formed with a branch connection 16 to which a house branch 17 is connected in a well known and conventional manner.

Just above the branch connection 16 the T body includes an upper portion 18 that is both internally and externally threaded. The internal threads are designated 19 and the external threads 20.

An acorn valve is referred to in its entirety by the reference character V. It is mounted in the upper portion 18 of the T body and by the internal threads 19 in manner later to be described. FIGURE 4 shows a punching attachment 21 which is mounted on the external threads 20 when a punch 22 is to be employed to penetrate the wall 11 of the main 10. After such penetration the punch 22 together with the attachment 21 are removed and a cap C is applied to the external threads 20 as shown in FIGURE 5.

Figure 2:
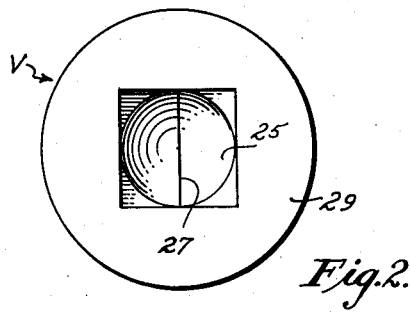
FIGURE 2 is a top plan view of the valve shown in FIGURE 1.
Figure 1:
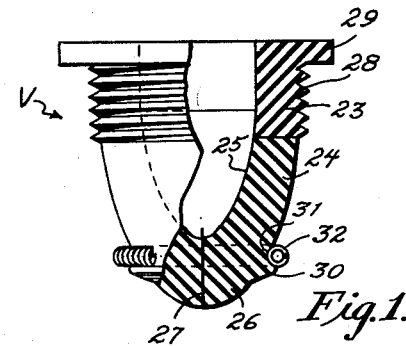
FIGURE 1 is a side view partly in section and partly in elevation of an acorn valve embodying the improvements of this invention.
Figure 3:
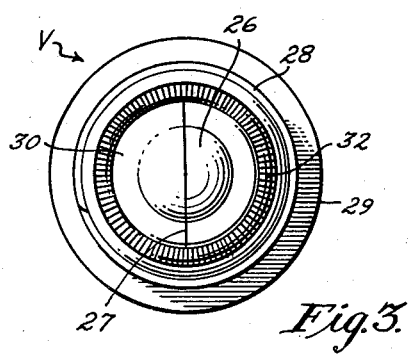
FIGURE 3 is a bottom plan view of the valve.

Referring now more particularly to FIGURES 1, 2 and 3 the improved details of the acorn valve V will be described. This valve V is made of rubber and comprises two parts. These are: An upper portion 23 of hard rubber and to which is integrally joined a lower portion 24 of soft rubber. The portions 23 and 24 together define an internal recess or socket 25, the lower end of which is closed by a nose 26. The nose 26 is formed with a transverse slit 27 which is adapted to receive and accommodate the punch 22 when the latter is passed through the valve.

The upper hard rubber portion 23 of the valve is formed with external threads 28 which co-operate with the internal threads 19 on the T body in maintaining the valve therein. Above these threads 28 the portion 23 is provided with an outstanding annular flange 29 which overlies the upper end edge of the portion 18 of the T body. This flange 29 functions as a sealing agent or gasket to prevent the escape of gas. In the above identified co-pending application the only seal of this nature between the valve and the T body is the interfitting or meshing threads. It is difficult to accurately machine threads in rubber and the need for accuracy is obviated by the flange. Moreover this flange functions as a gasket when it is compressed by the tool accommodating the punch.

The lower portion 24 of the valve V in the zone of the slit 27 is provided with an outstanding rib or protuberance 30 which together with the portion of the nose immediately thereabove defines an annular groove 31. Received in this annular groove 31 is a contracting coil spring 32. The groove 31 serves to accurately position the spring 32 with respect to the slit 27 so that the effect of the contracting spring is to maintain the slit 27 closed at all times except when it is distended by the punch passing therethrough.

It is evident that even should the punch be left in the slit for a prolonged period and the rubber should exihibit a tendency to lose some of its elastic and resilient properties the spring 32 still insures of complete and effective closing of the slit.

While a preferred specific embodiment of the invention is hereinbefore set forth it is clearly to be understood that the invention is not to be limited to the exact constructions, mechanisms and devices illustrated and described because various modifications of these details may be provided in putting the invention in practice within the purview of the appended claim.

What is claimed is:

In combination, a punching T having a T body with an upper tubular portion that is internally and externally threaded, an acorn valve in said upper portion and having an externally threaded portion received in the internal threads of said T body, said acorn valve having a rounded nose formed with a slit, said nose also being provided with an annular groove in the zone of said slit, a contracting coil spring in said groove normally maintaining said slit closed, an outstanding flange integrally carried by said acorn valve and overlying the upper end edge of said T body, and a tool mounted on the external threads of said T body, said tool being in sealing engagement with said flange and including a punch adapted to pass through said acorn valve.

References Cited in the file of this patent

UNITED STATES PATENTS

| 512,832 | Layden | Jan. 16, 1894 |
| 795,642 | Nelson | July 25, 1905 |
| 1,701,786 | McMurray | Feb. 12, 1929 |
| 2,349,463 | Riddell | May 23, 1944 |

FOREIGN PATENTS

| 12,342 | Great Britain | of 1894 |